(12) United States Patent
Taylor et al.

(10) Patent No.: US 8,400,410 B2
(45) Date of Patent: Mar. 19, 2013

(54) FERROMAGNETIC USER INTERFACES

(75) Inventors: Stuart Taylor, Cambridge (GB); Jonathan Hook, Newcastle-upon-Tyne (GB); Shahram Izadi, Cambridge (GB); Nicolas Villar, Cambridge (GB); David Alexander Butler, Cambridge (GB); Stephen E. Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 12/472,257

(22) Filed: May 26, 2009

(65) Prior Publication Data
US 2010/0302199 A1 Dec. 2, 2010

(51) Int. Cl.
*G06F 3/041* (2006.01)
(52) U.S. Cl. ............................................. 345/173
(58) Field of Classification Search .......... 345/156–157, 345/173–178
See application file for complete search history.

(56) References Cited

U.S. PATENT DOCUMENTS

| | | | |
|---|---|---|---|
| 7,148,875 B2 | 12/2006 | Rosenberg | |
| 2002/0044132 A1 | 4/2002 | Fish | |
| 2002/0139842 A1 | 10/2002 | Swaine | |
| 2004/0080491 A1* | 4/2004 | Takatsuka et al. | 345/156 |
| 2006/0256075 A1 | 11/2006 | Anastas | |
| 2007/0182718 A1* | 8/2007 | Schoener et al. | 345/173 |
| 2008/0165141 A1 | 7/2008 | Christie | |
| 2008/0180399 A1 | 7/2008 | Cheng | |

OTHER PUBLICATIONS

Bicchi, A., E. P. Scilingo, N. Sgambelluri, and D. De Rossi, Haptic interfaces based on magnetorheological fluids, Proceedings of Eurohaptics, 2002, pp. 6-11, S. A. Wall, B. Riedel, A. Crossan, and M. R. McGee ed.

Chouvardas, V. G., and A. N. Miliou, Tactile displays: A short overview and recent developments, Developments, 5th Int'l Conf. on Tech. and Automation, Oct. 2005, pp. 246-251, Dimitris Manolakis, Aristides Gogoussis ed.

Fong, T. W., F. Conti, S. Grange and C. Baur, Novel interfaces for remote driving: Gesture, haptic, and PDA, SPIE Telemanipulator and Telepresence Technologies VII, Nov. 2000, Howie M. Choset, Douglas W. Gage, Matthew R. Stein ed.

Mavroidis, C., Y. Bar-Cohen, M. Bouzit, Haptic interfaces using electrorheological fluids, Electroactive Polymer (EAP) Actuators as Artificial Muscles: Reality, Potentials and Challenges, Ch. 19, Y. Bar-Cohen Editor, SPIE Optical Eng'g.

White, T., Introducing liquid haptics in high bandwidth human computer interfaces, Thesis, Massachusetts Institute of Technology, Jun. 1998.

Zhang, Wei-Wei, User interface design with new techniques, Brief Studies in Computer Science, Department of Computer Sciences, University of Tampere, Roope Raisamo and Erkki Mäkinen (eds.), 2004.

* cited by examiner

*Primary Examiner* — Michael Pervan
(74) *Attorney, Agent, or Firm* — Zete Law, P.L.L.C.; MacLane C. Key

(57) ABSTRACT

Ferromagnetic user interfaces are described. In embodiments, user interface devices are described that can detect the location of movement on a user-touchable portion by sensing movement of a ferromagnetic material. In some embodiments sensors are arranged in a two dimensional array, and the user interface device can determine the location of the movement in a plane substantially parallel to the two-dimensional array and the acceleration of movement substantially perpendicular to the two-dimensional array. In other embodiments, user interface devices are described that can cause a raised surface region to be formed on a ferrofluid layer of a user-touchable portion, which is detectable by the touch of a user. Embodiments describe how the raised surface region can be moved on the ferrofluid layer. Embodiments also describe how the raised surface region can be caused to vibrate.

20 Claims, 17 Drawing Sheets

FERROMAGNETIC USER INTERFACES

BACKGROUND

User interface devices enable users to interact with and control computing-based devices. One type of user interface utilizes touch input from a user's fingers to interact with the computer. For example, a touch-pad (also called a track-pad) is commonly provided on a notebook computer, such that, by drawing their finger over the touch-pad the user can control the position of a cursor on a display. Such touch-pads can determine the position of the user's finger by detecting localized capacitance changes when a finger (acting as a virtual ground) is brought into contact with the touch-pad.

Touch-based user interfaces (such as a touch-pad) generally provide a hard, continuous surface with which the user interacts to provide input to the computer. Such devices are only able to sense the location of the user's touch on the surface of the user interface, and are not able to sense any information in other spatial directions. In addition, user interface devices which use capacitive sensing require the presence of a finger acting as a virtual ground to operate, and do not operate if the user is, for example, wearing gloves or using an implement such as a stylus. Furthermore, the user of such a touch-based user interface does not feel any physical or haptic feedback, resulting in a disconnection from the process of interacting with the computer.

The embodiments described below are not limited to implementations which solve any or all of the disadvantages of known user interface devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Ferromagnetic user interfaces are described. In embodiments, user interface devices are described that can detect the location of movement on a user-touchable portion by sensing movement of a ferromagnetic material. In some embodiments sensors are arranged in a two dimensional array, and the user interface device can determine the location of the movement in a plane substantially parallel to the two-dimensional array and the acceleration of movement substantially perpendicular to the two-dimensional array. In other embodiments, user interface devices are described that can cause a raised surface region to be formed on a ferrofluid layer of a user-touchable portion, which is detectable by the touch of a user. Embodiments describe how the raised surface region can be moved on the ferrofluid layer. Embodiments also describe how the raised surface region can be caused to vibrate.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computing system, the system described is provided as an example and not a limitation. As those skilled in the art will appreciate, the present examples are suitable for application in a variety of different types of systems requiring touch-based user interfaces.

Figure 1:
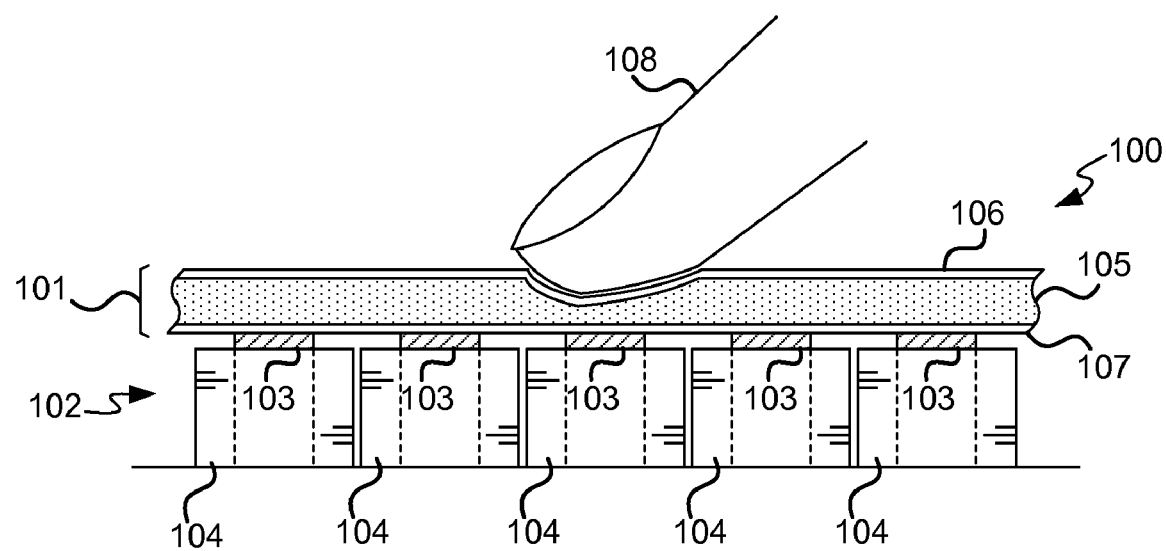
FIG. 1 shows a user interface device for detecting touch input based on the movement of ferromagnetic fluid.

FIG. 1 illustrates an example user interface device 100 that detects touch input from a user based on the movement of ferromagnetic material. The user interface device 100 comprises a user-touchable portion 101, below which is a plurality of sensors 102. The sensors 102 shown in the example of FIG. 1 are in the form of "pick-up" coils, each comprising a permanent magnet core 103 around which is wound a coil of wire 104.

The user-touchable portion 101 comprises a ferromagnetic fluid layer 105 located between a compliant, flexible membrane 106 forming the surface of the user-touchable portion 101, and a base layer 107. The base layer 107 can be formed from the same compliant material as the flexible membrane 106, or can be formed from a different, more rigid material.

In the example shown in FIG. 1, the user-touchable portion 101 is mounted directly on top of the sensors 102. In other examples, a gap can be present between the user-touchable portion 101 and the sensors 102, or other hardware can be located between the user-touchable portion 101 and the sensors 102.

The ferromagnetic fluid layer 105 can contain any fluid that is capable of sufficiently influencing a magnetic field. The term ferromagnetic is used here in the broad sense of a material that can experience magnetization, i.e. the material is attracted by a magnetic field. The term ferromagnetic is therefore intended to also include materials that exhibit behaviors including (but not limited to) ferrimagnetism, antiferromagnetism, and paramagnetism.

In one example, the ferromagnetic fluid layer 105 can contain ferrofluid. Ferrofluid is a colloidal mixture comprising nanometer scale ferromagnetic particles suspended in a carrier fluid. The particles are held in suspension by the effects of Brownian motion, and do not settle. The ferromagnetic particles are coated with a surfactant to prevent their agglomeration.

In another example, the ferromagnetic fluid layer 105 can contain magnetorheological fluid. A magnetorheological fluid is a suspension of micrometer-scale ferromagnetic particles in a carrier fluid, typically an oil. Both ferrofluids and magnetorheological fluids are capable of disturbing the magnetic field from the permanent magnet 103, as described below.

Figure 2:
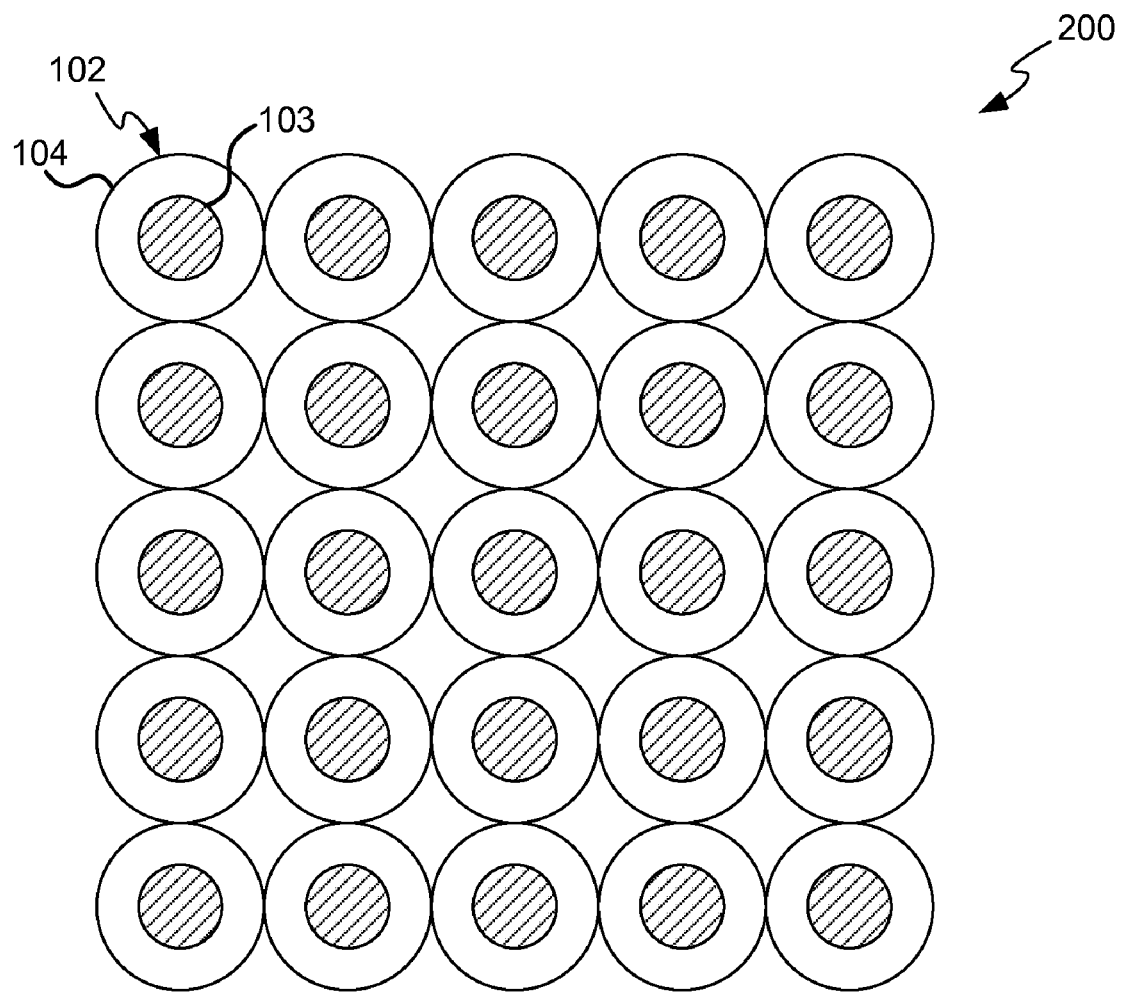
FIG. 2 shows a plan view of a two-dimensional sensor array.
Figure 3:
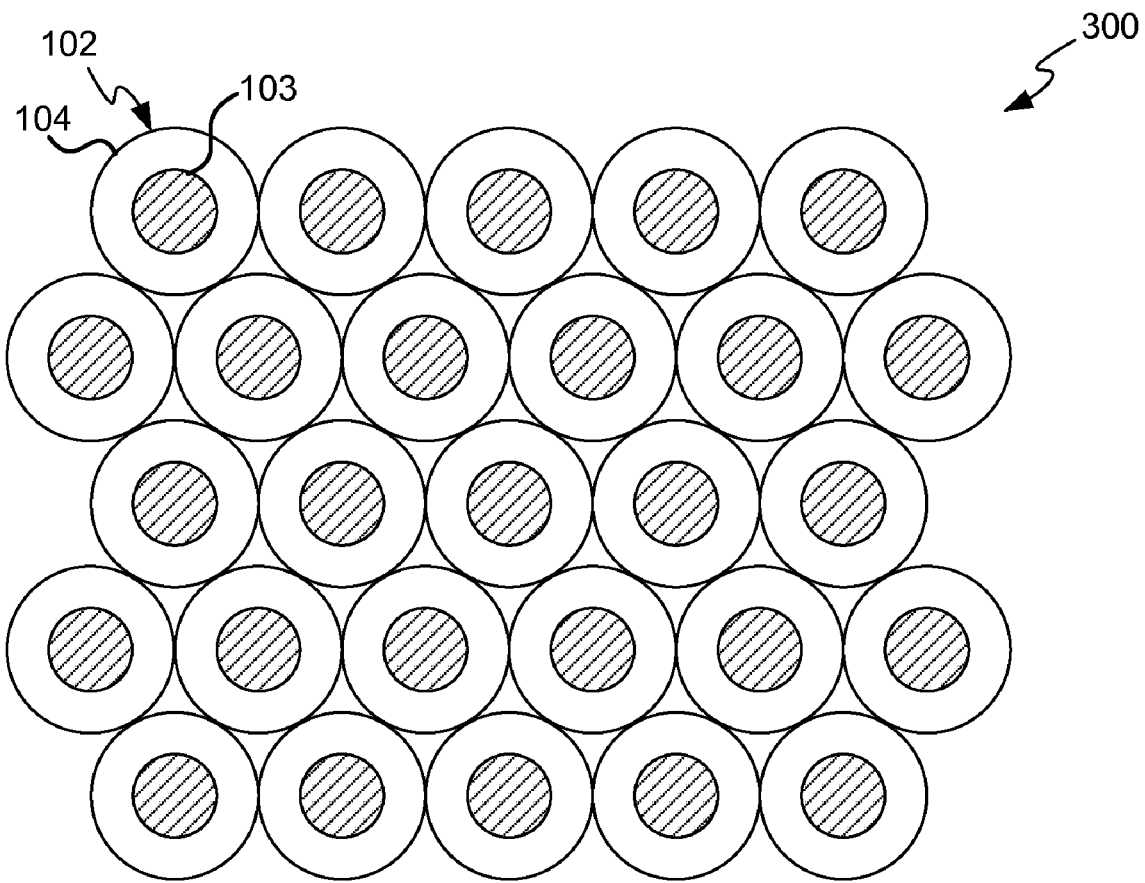
FIG. 3 shows a plan view of an alternative two-dimensional sensor array.

The plurality of sensors 102 can be arranged in a two dimensional array 200, as illustrated in the example plan view shown in FIG. 2. In this example, the sensors 102 are arranged in a regular grid. Note that the user-touchable portion 101 covers the two dimensional array 200 of the sensors 102, but is not illustrated in FIG. 2. The grid of sensors 102 can be of any suitable shape or dimensions to correspond with the user-touchable portion 101. An alternative two-dimensional array 300 of sensors 102 is illustrated in FIG. 3, in which the sensors are more closely packed and not arranged in a regular grid pattern.

Figure 4:
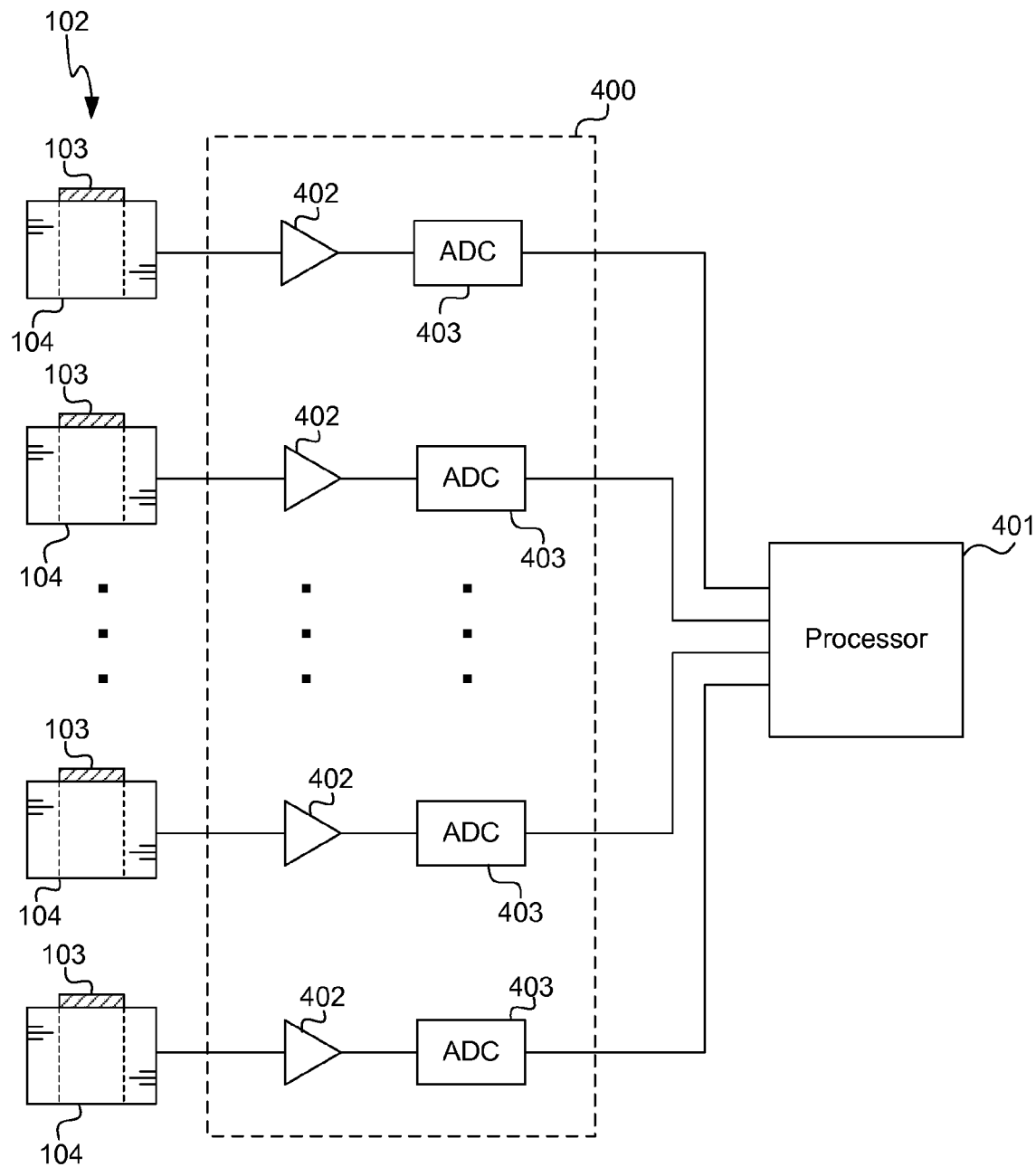
FIG. 4 shows a schematic diagram of a circuit for connection to the touch input user interface device.

FIG. 4 illustrates a circuit diagram for the user interface device 100. Each of the sensors 102 is individually connected to an interface circuit 400. The interface circuit 400 is connected to a processor 401. In the example shown in FIG. 4, the interface circuit 400 comprises a plurality of amplifiers 402 arranged such that each of the sensors 102 is connected to an input of one of the amplifiers 402. Each of the amplifiers 402 has an output connected to the input of one of a plurality of analog to digital converters (ADC) 403. An output from each of the ADCs 403 is connected to the processor 401. Note that the plurality of ADCs 403 can be fabricated on a single integrated circuit, and the plurality of amplifiers 402 can also be fabricated on a single integrated circuit.

In another example, the plurality of ADCs 403 can be replaced with a single ADC and a multiplexer, such that the multiplexer switches between each of the outputs of the amplifiers 402 in turn, providing the output signals from the amplifiers to the single ADC sequentially. Similarly, in a further example, the outputs from the sensors 102 can be multiplexed and provided to a single amplifier sequentially.

The operation of the user interface device 100 is now described with reference to FIG. 1 and FIG. 4. In a steady state, without a user touching the user interface device 100, the permanent magnets 103 from each of the sensors 102 are creating a constant magnetic field, and no electrical current is flowing in the coils of wire 104.

When a user touches the user-touchable portion 101, as illustrated by the finger 108 in FIG. 1, the flexible membrane 106 is deformed. The deformation of the flexible membrane 106 causes the ferromagnetic fluid in the ferromagnetic fluid layer 105 to move. The movement of the ferromagnetic fluid disturbs the magnetic field produced by the permanent magnet 103 of the sensor below the position of movement. In other words, the movement of the ferromagnetic fluid modulates the magnetic flux linking the coil of wire 104 in the sensor below the position of movement. This induces a current in the coil of wire 104 of the sensor in question. Note that a current can be induced in more than one of the sensors 102, as described in more detail below.

The induced current in the coil of wire 104 gives rise to a small output electrical signal from the coil of wire 104. The output electrical signal is amplified by the corresponding amplifier 402 for the sensor in question. The amplified electrical signal is converted to a digital value by the corresponding ADC 403, and the digital value is provided to the processor. Preferably, the ADCs 403 and the processor 401 can be arranged to rapidly capture the magnitude of the electrical signal from each of the sensors, such that small delays between electrical signals from different sensors can be distinguished. In other words, the sampling rate of the ADCs 403 is preferably sufficiently rapid that short differences in arrival times of signals from each of the sensors can be discerned.

The processor analyses the electrical signals from all of the sensors 102, and upon receiving the electrical signal from the sensor below the movement, the processor can determine that movement is occurring in the ferromagnetic fluid in the location corresponding to that sensor. Therefore, in this way, the location of the touch by the finger 108 on the user-touchable portion 101 can be determined.

In addition, the processor can analyze the magnitude of the electrical signal from the sensor below the movement. The magnitude of the electrical signal is an indicator of the acceleration of the touch in the direction substantially perpendicular to the plane of the surface of the user-touchable portion 101 (i.e. the direction into the page in FIGS. 2 and 3). This therefore enables the processor to determine a measure of the impact force with which the user has depressed the flexible membrane 106. This is possible as a "harder" impact force moves the ferromagnetic fluid more rapidly than a "softer" impact force.

In other words, the user interface device 100 is able to determine information about touch inputs in the x and y directions (parallel to the plane of the user-touchable portion 101) and also the z direction (perpendicular to the plane of the user-touchable portion 101).

In addition to determining the position of movement on the user-touchable portion 101 using the single sensor below the movement, the user interface device 100 can also utilize information from the surrounding sensors. For example, when touched, a disturbance is caused in the ferromagnetic fluid, and because of this the magnetic fields of sensors surrounding the touched location are disturbed a short time after the touch. This can be utilized by the processor 401 to more accurately determine the position of the touch. The processor 401 can detect an initial electrical signal from one or more sensors, and then subsequent smaller signals from surrounding sensors after a time delay. The processor 401 uses the relative arrival times of the signals, and interpolates between them to accurately determine the point of origin of the touch.

This technique can be used to provide a determination of the position of a touch with a higher resolution than the spacing of the plurality of sensors 102.

The relative magnitude of the electrical signals from multiple sensors can also be used to estimate the size of the depression in the user-touchable portion 101. For example, if the user presses the user-touchable portion 101 with the side of his hand, then this causes movement in the ferromagnetic fluid above several sensors. The processor 401 can interpret the substantially simultaneous electrical signals from the several sensors in the disturbed region as a large area being touched. Interpolation between the sensors can be used to provide an overall impression of the disturbed region. For example, bi-cubic interpolation can be utilized. Conversely, if the user lightly depresses the user-touchable portion 101 with the tip of one fingernail, then this only causes a small, localized disturbance over one sensor, and no disturbance in any neighboring sensors. This is therefore interpreted by the processor 401 as a small point touch. The touch from the tip of an index finger can cause a large disturbance over one sensor, and a smaller disturbance over the surrounding sensors, which can be interpreted by the processor as a "regular" finger touch.

Because each of the sensors 102 is providing electrical signals to the processor independently from each other, the user interface device 100 is able to detect the location of a plurality of substantially simultaneous separate touches. This is known as "multi-touch" capability. Multi-touch capability enables the user interface device 100 to use multiple fingers to issue a much larger number of commands to the computer, using only touches and gestures.

The user interface device illustrated in FIG. 1 provides the ability to sense and detect user input on a malleable, compliant surface. A malleable surface is much more compelling to the user than a hard surface, as the user can feel a deformation in the surface, and feel a substance moving beneath his finger, therefore giving a greater sense of physical feedback and connection with the operation.

In addition, because the user interface device 100 determines the location of the touch on the basis of physical movement, the user interface device 100 can be operated by a user wearing gloves or using an implement such as a stylus or pen.

Because the ferromagnetic fluid exhibits a degree of magnetic attraction, and the sensors 102 in FIG. 1 comprise a permanent magnet 103, the user interface device 100 can be arranged to exhibit a degree of hysteresis in the movement of the ferromagnetic fluid layer 105. In particular, after being depressed, the ferromagnetic fluid layer 105 does not return instantly to its previous, flat shape due to the attraction to the permanent magnets 103. The degree of hysteresis can be selected by the proximity of the ferromagnetic fluid layer 105 to the permanent magnets 103, the strength of the permanent magnets 103, and the particular properties of the ferromagnetic fluid. The presence of the hysteresis provides the user with tactile feedback of where on the user-touchable portion 101 they have just touched.

The ferromagnetic fluid also exhibits other properties in the presence of a magnetic field, as discussed in more detail hereinafter. However, the user interface device 100 is arranged such that the magnetic fields from the sensors 102 are not sufficient to cause these properties to a degree detectable to the user.

Figure 5:
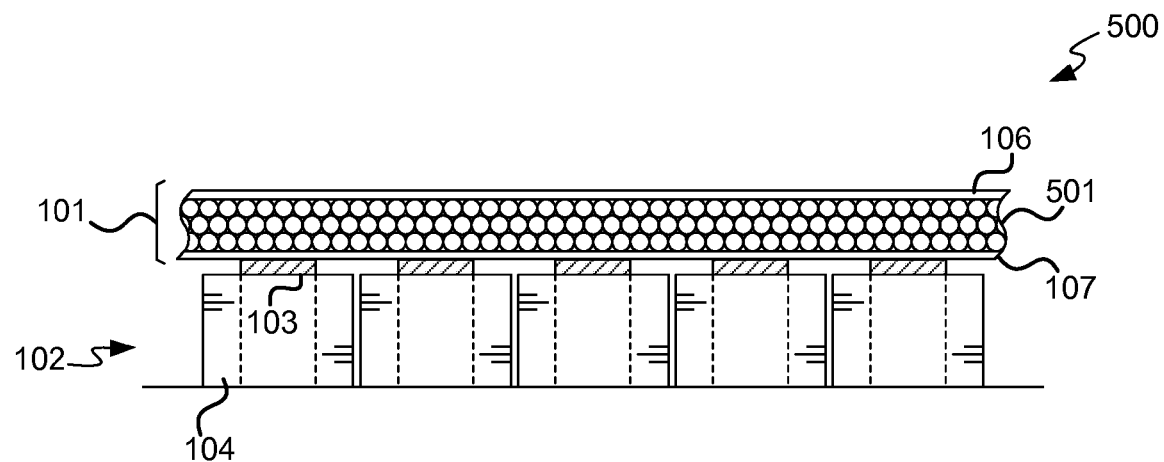
FIG. 5 shows a user interface device for detecting touch input based on the movement of ferromagnetic ball bearings.

Reference is now made to FIG. 5, which illustrates an alternative example of a user interface device 500 that detects touch input from a user based on the movement of ferromagnetic material. The user interface device 500 in FIG. 5 is similar to that in FIG. 1 in that it comprises a user touchable portion 101 and a plurality of sensors 102 comprising a permanent magnet 103 and a coil of wire 104. However, in the example shown in FIG. 5, the ferromagnetic material contained between the flexible membrane 106 and the base layer 107 is not a fluid, but instead comprises a plurality of ball bearings 501 made from a ferromagnetic material.

The operation of the user interface device 500 is similar to that described above with reference to FIG. 1, and is connected to the circuit as shown in FIG. 4. When the flexible membrane 106 on the user-touchable portion 101 is touched by the user the ball bearings 501 are disturbed and move. This influences the magnetic field of the sensors in proximity to the movement, thereby generating an electrical signal that can be interpreted by the processor as described above. In alternative examples, the ball bearings 501 can be located within an open-topped container (i.e. the flexible membrane 106 of FIG. 5 is not present). In this case the user interacts directly with the ball bearings 501 to move them within the container.

The user interface device 500 provides substantial tactile feedback to the user. Because the users can clearly feel the ball bearings 501 moving beneath their fingers, they experience a much greater physical connection with the computer with which they are interacting. The tactile characteristics of the user interface device 500 can be altered by changing the size of the ball bearings 501. For example, very small bearings (e.g. less than 1 mm diameter) gives the user interface device 500 a smooth, flowing feeling to the user, whereas larger ball bearings (e.g. greater than 3 mm diameter) can be individually felt by the user. The size of the ball bearings 501 can be tailored according to the application for which the user interface device 500 is intended. In one example, a single large ball bearing can be rolled around on the base layer 107 by a user, such that the magnetic field of the sensors beneath the ball bearing is disturbed.

Figure 6:
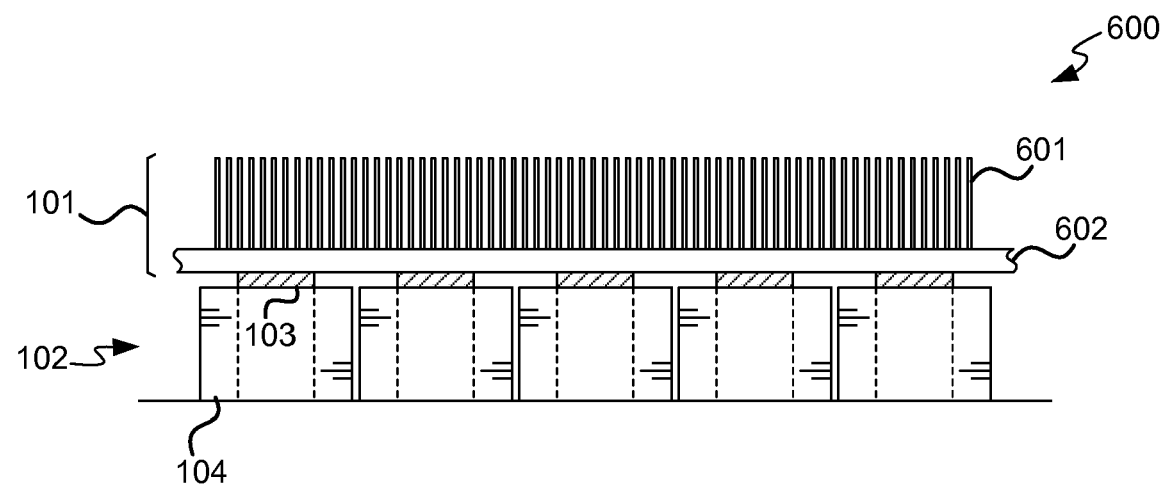
FIG. 6 shows a user interface device for detecting touch input based on the movement of ferromagnetic bristles.

Reference is now made to FIG. 6, which illustrates a further alternative example of a user interface device 600 that detects touch input from a user based on the movement of ferromagnetic material. The user interface device 600 in FIG. 6 is similar to that in FIG. 1 in that it comprises a user touchable portion 101 and a plurality of sensors 102 comprising a permanent magnet 103 and a coil of wire 104. In the example shown in FIG. 6, the user-touchable portion 101 does not have a ferromagnetic fluid, but instead comprises a plurality of bristles 601 mounted on a substrate 602.

The bristles 601 have at least a portion comprising a ferromagnetic material. In the simplest case, the bristles 601 themselves are made from a ferromagnetic material, for example in a form similar to a wire brush. In another example, the bristles can be formed from a softer, more compliant material, such as a plastic. In this case, the bristles 601 can, for example, be impregnated with particles of ferromagnetic material, have an inner core of ferromagnetic material, or have a coating of ferromagnetic material.

The operation of the user interface device 600 is similar to that described above with reference to FIG. 1, and is connected to the circuit as shown in FIG. 4. When the user-touchable portion 101 is touched by the user the bristles 601 are disturbed and move. This influences the magnetic field of the sensors in proximity to the movement, thereby generating an electrical signal that can be interpreted by the processor as described above.

As with the example in FIG. 5, the user interface device 600 of FIG. 6 provides substantial tactile feedback as user can feel the bristles 601 moving beneath their finger. The tactile characteristics of the user interface device 600 can be changed by selecting the material, thickness and density of packing of the bristles 601 in accordance with the application for which the user interface device 600 is intended.

Figure 7:
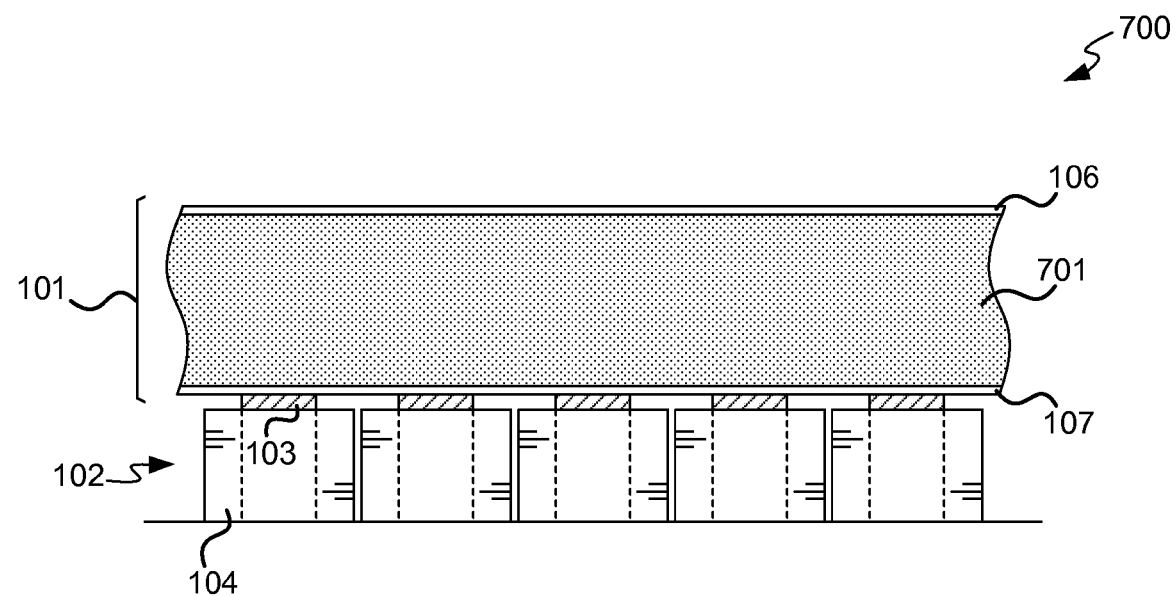
FIG. 7 shows a user interface device for detecting touch input based on the movement of ferromagnetic filings.

Reference is now made to FIG. 7, which illustrates a yet further alternative example of a user interface device 700 that detects touch input from a user based on the movement of ferromagnetic material. The user interface device 700 in FIG. 7 is similar to that in FIG. 1 in that it comprises a user touchable portion 101 and a plurality of sensors 102 comprising a permanent magnet 103 and a coil of wire 104. However, in the example shown in FIG. 5, the ferromagnetic material contained between the flexible membrane 106 and the base layer 107 is not a fluid, but instead comprises iron filings 701 or other similar irregular solid particles made from a ferromagnetic material. In addition, the thickness of the layer of iron filings 701 is greater than that of the ferromagnetic fluid layer 105 of FIG. 1.

The operation of the user interface device 700 is similar to that described above with reference to FIG. 1, and is connected to the circuit as shown in FIG. 4. When the flexible membrane 106 on the user-touchable portion 101 is touched by the user the iron filings 701 are disturbed and move. This influences the magnetic field of the sensors in proximity to the movement, thereby generating an electrical signal that can be interpreted by the processor as described above.

Because of the thickness of the layer of iron filings 701, the user interface device 700 has different tactile characteristics to those described above. In particular, the user-touchable portion is able to be pinched, squeezed and molded by the user. The iron filings 701 can also be arranged to remain in the shape molded by the users. This type of user interface device 700 can be of particular use when the user is interacting with and manipulating objects in three-dimensional virtual environments.

Each of the examples above was described with reference to sensors 102 comprising permanent magnets 103 and coils of wire 104. In other examples, other types of sensor capable detecting the movement of ferromagnetic materials can be used. For example, a micro-electro mechanical system (MEMS) magneto sensor or a hall-effect sensor can be used, and can be made more compact than pick-up coils. The size and density of the sensors can be determined in accordance with the desired spatial resolution of the user interface device 100. Such alternative sensors can be used with any of the ferromagnetic materials discussed above.

Figure 8:
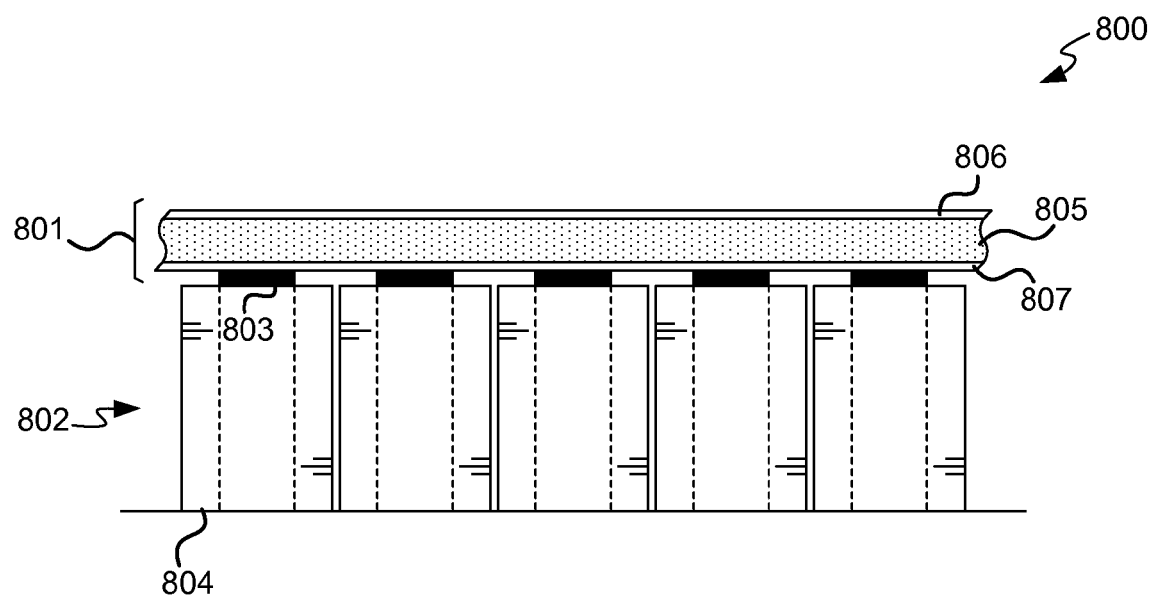
FIG. 8 shows a user interface device for providing haptic feedback.

Reference is now made to FIG. 8, which illustrates a user interface device 800 that is arranged to provide a haptic output to the user of the device using a ferrofluid. Haptic is taken here to mean pertaining to the sense of touch.

The user interface device 800 comprises a user-touchable portion 801, below which is a plurality of electrically switchable magnets 802. The electrically switchable magnets 802 in the example of FIG. 8 are electromagnets comprising a core 803 around which is wound a coil of wire 804. Preferably, the core 803 is made of a ferromagnetic material, although in other examples the core 803 can be omitted.

The user-touchable portion 801 comprises a ferrofluid layer 805 located between a compliant, flexible membrane 806 forming the surface of the user-touchable portion 801, and a base layer 807. The base layer 807 can be formed from the same compliant material as the flexible membrane 806, or can be formed from a different, more rigid material. Preferably, the ferrofluid layer is between 1 mm and 4 mm thick.

In the example shown in FIG. 8, the user-touchable portion 801 is mounted directly on top of the electrically switchable magnets 802. In other examples, a gap can be present between the user-touchable portion 801 and the electrically switchable magnets 802, or other hardware can be located between the user-touchable portion 801 and the electrically switchable magnets 802, such as input sensing devices and/or a display.

As stated above, ferrofluid (as present in the ferrofluid layer 805) is a colloidal mixture comprising nanometer scale ferromagnetic particles suspended in a carrier fluid. Ferrofluids exhibit particular properties when exposed to a sufficiently strong magnetic field. When a magnetic field is applied to ferrofluid the ferromagnetic particles align themselves with the lines of magnetic flux forming a localized raised region on the surface of the ferrofluid. If the magnetic field is strong enough, a pattern of regular corrugations (in the form of spiky bumps) are formed on the surface of the ferrofluid.

Figure 9:
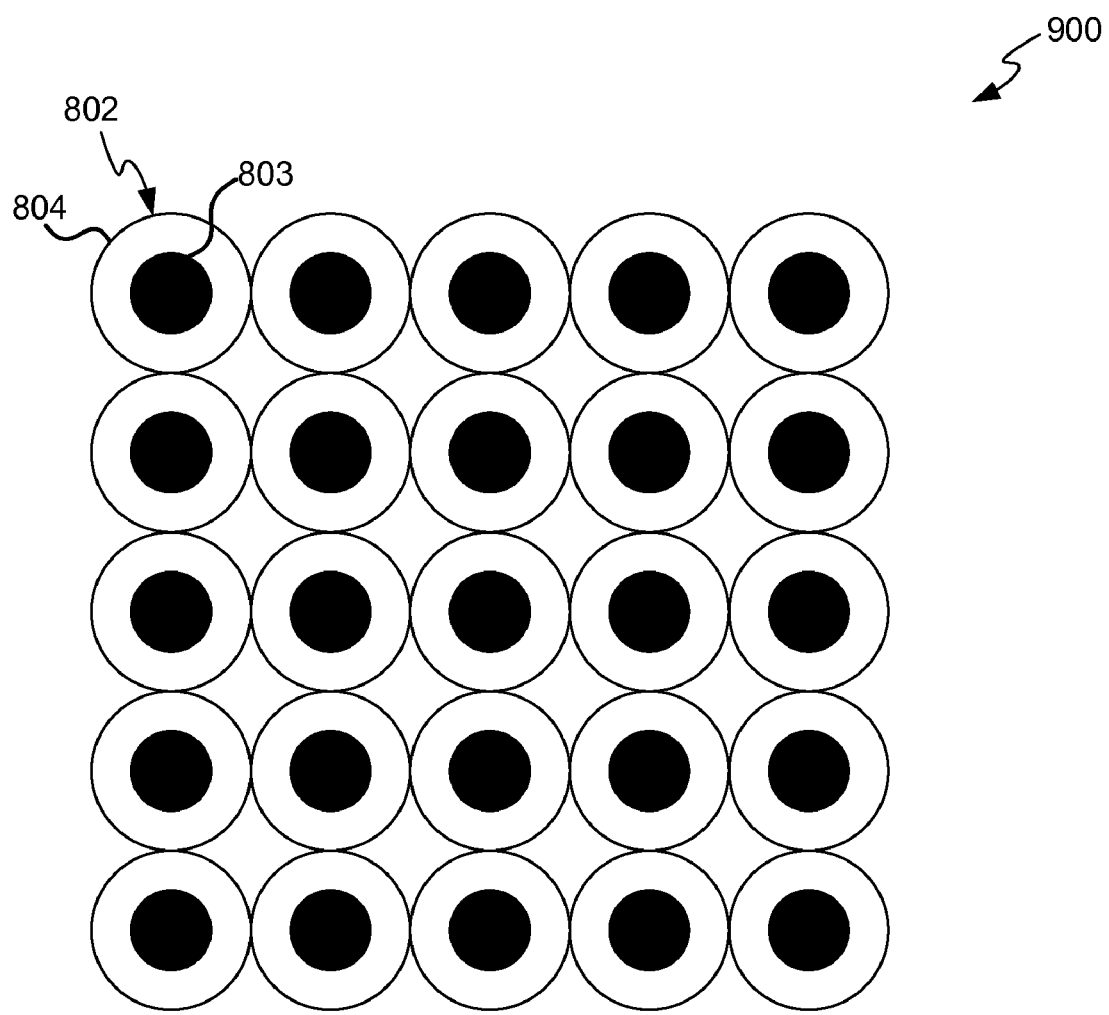
FIG. 9 shows a plan view of a two-dimensional electrically switchable magnet array.
Figure 10:
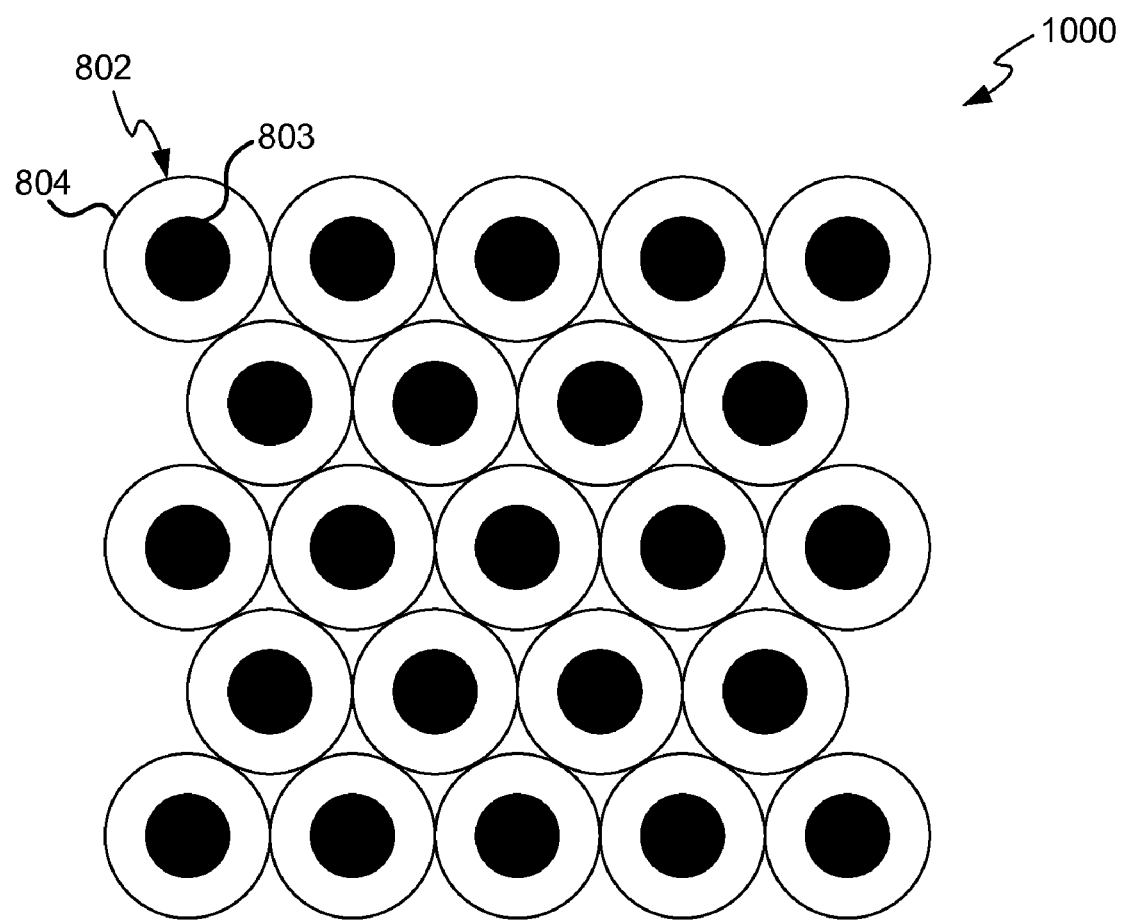
FIG. 10 shows an alternative plan view of a two-dimensional electrically switchable magnet array.

The plurality of electrically switchable magnets 802 can be arranged in a two dimensional array 900, as illustrated in the example plan view shown in FIG. 9. In this example, the electrically switchable magnets 802 are arranged in a regular grid. Note that the user-touchable portion 801 covers the two dimensional array 900 of the electrically switchable magnets 802, but is not illustrated in FIG. 2. The grid of electrically switchable magnets 802 can be of any suitable shape or dimensions to correspond with the user-touchable portion 801. An alternative two-dimensional array 1000 of electrically switchable magnets 802 is illustrated in FIG. 10, in which the sensors are more closely packed and not arranged in a regular grid pattern.

Figure 11:
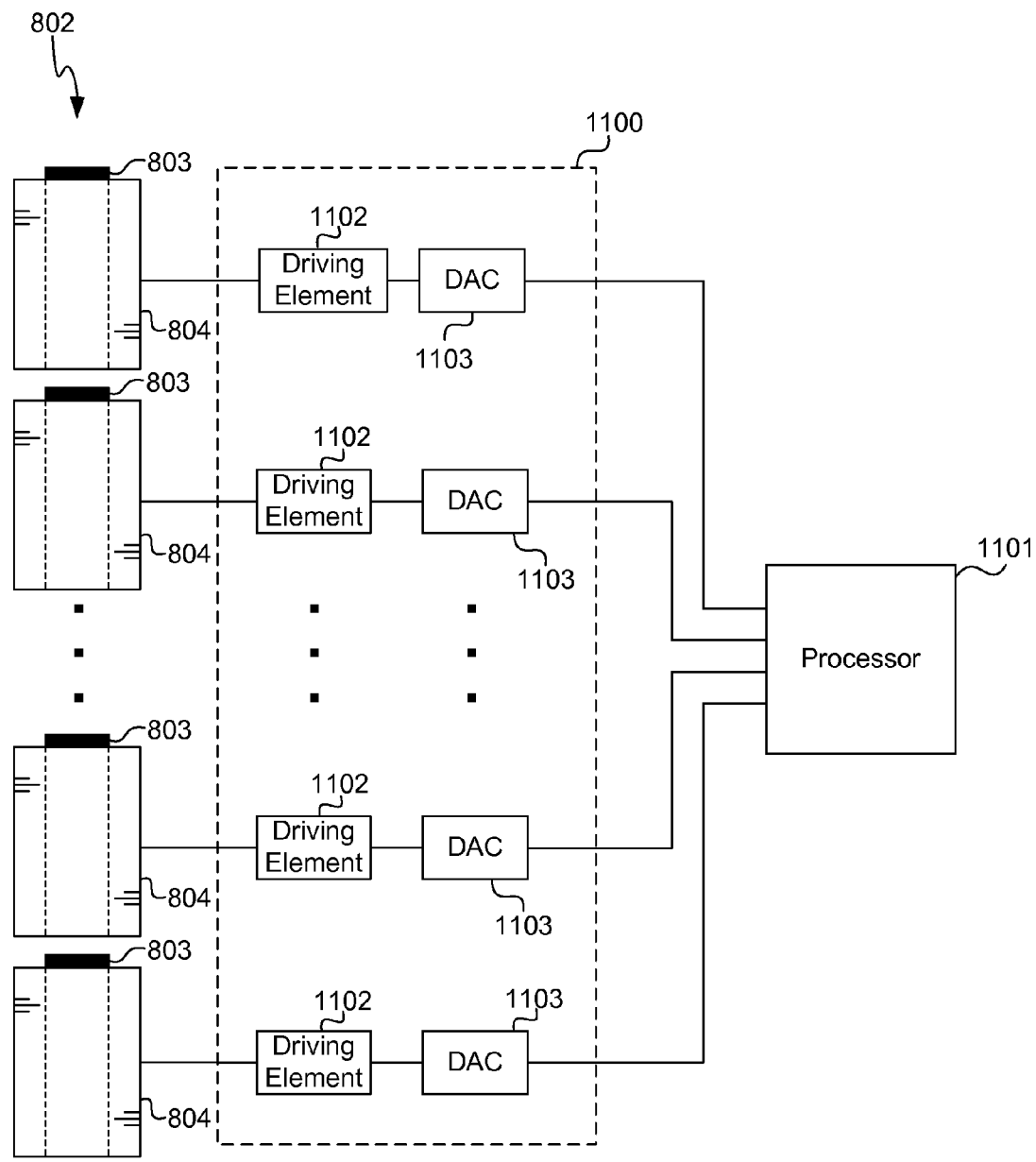
FIG. 11 shows a schematic diagram of a circuit for connection to the haptic feedback user interface device.

FIG. 11 illustrates a circuit diagram for the user interface device 800. Each of the electrically switchable magnets 802 is individually connected to an interface circuit 1100. The interface circuit 1100 is connected to a processor 1101. In the example shown in FIG. 11, the interface circuit 1100 comprises a plurality of driving elements 1102, of which each one has an output connected to one of the electrically switchable magnets 802. The driving elements 1102 can comprise, for example, power transistors or field effect transistors. The driving elements 1102 are arranged to energize the electrically switchable magnets 802 with a given polarity and magnitude.

Optionally, the interface circuit 1100 further comprises a plurality of digital to analog converters (DAC) 1103. Each of the driving elements 1102 has an input connected to one of a plurality of DACs 1103, and each of the DACs 1103 has an input connected to the processor. The provision of DACs 1103 in the interface circuit 1100 enables the electrically switchable magnets 802 to be provided with a controllable analog voltage level such that the magnitude of the magnetic field produced by the electrically switchable magnets 802 can be controlled. Note that the plurality of DACs 1103 can be fabricated on a single integrated circuit.

In other examples, the DACs 1103 can be omitted, and the electrically switchable magnets 802 can be driven either on or off by the driving elements 1102 using digital signals from the processor 1101. In another example, an alternative technique for driving the electrically switchable magnets 802 with a variable strength can be used that does not require DACs, such as pulse width modulation.

The operation of the user interface device 800 is now described with reference to FIG. 8 and FIG. 11. In a steady state, without any output commands from the processor 1101, the user-touchable portion 801 remains flat.

When the processor determines that haptic feedback is to be provided to a specific part of the user-touchable portion 801, it issues a command to activate at least one specific electrically switchable magnet 802. This comprises sending digital data from the appropriate output of the processor 1101. The digital data represents a particular analog voltage amplitude, and the respective DAC 1103 converts the digital data into the analog voltage. The analog voltage is provided to the respective driving element 1102, which energizes the electrically switchable magnet 802 with a driving signal having a polarity and magnitude in accordance with the analog voltage.

Figure 12:
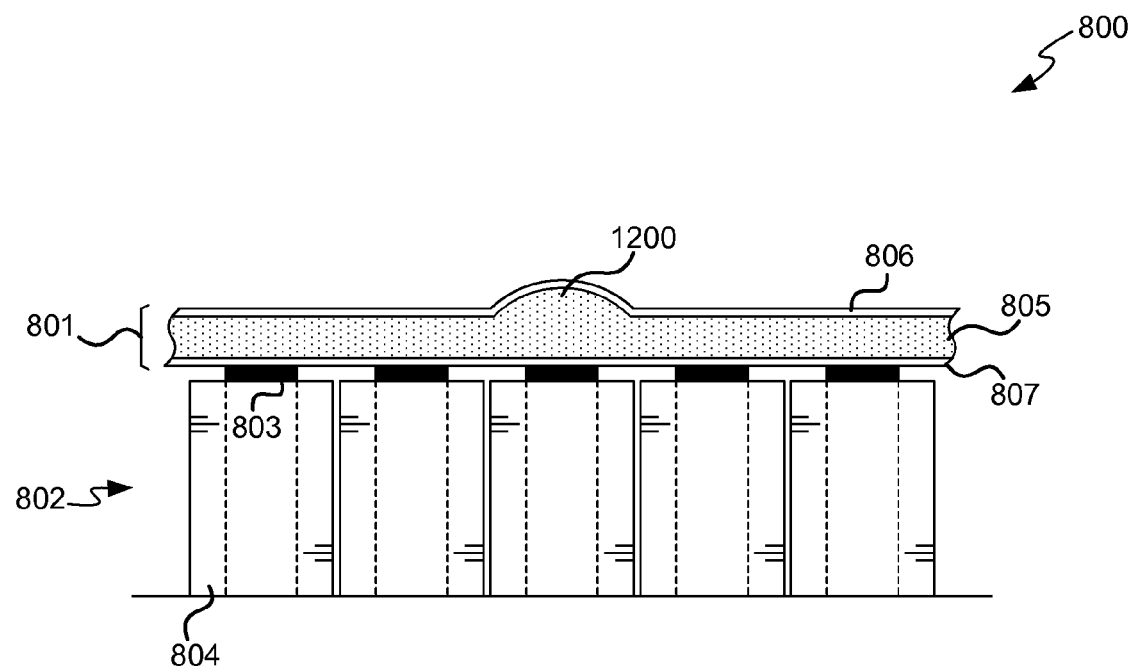
FIG. 12 shows a user interface device for providing haptic feedback with a raised surface region.

When one of the electrically switchable magnets 802 is energized, a magnetic field is produced. The magnetic field flows through the ferrofluid layer 805, and this causes the ferrofluid to react, as illustrated in FIG. 12. A raised surface region 1200 is created on the surface of the ferrofluid above the electrically switchable magnet 802 that has been activated. A user touching the surface of the user-touchable portion 801 is able to detect the presence of the raised surface region on the ferrofluid layer 805. The flexible membrane 806 is sufficiently compliant for the user to feel the raised surface region through the flexible membrane 806.

Therefore, the user interface device 800 shown in FIG. 8 is able to computationally control the physical shape of a surface, thus enabling a technique for providing haptic/tactile feedback to a user. As well as driving a single electrically switchable magnet 802, the processor 1101 can also control the substantially simultaneous driving of multiple electrically switchable magnets 802, each with the same or different polarities and magnitudes.

For example, the processor 1101 can control the activation of the electrically switchable magnets 802 to cause the surface of the ferrofluid layer 805 to comprise an array of bumps by driving each of the electrically switchable magnets 802 with the same polarity. Alternatively, larger raised areas can be created by driving alternate electrically switchable magnets 802 with different polarities, which causes the magnetic fields from the electrically switchable magnets 802 to combine across multiple magnets. Because the physical surface topology of the user interface device 800 can be computer controlled meaningful haptic feedback can be provided to the user. For example, the processor 1101 can create the feeling of boundaries or shapes on the user-touchable portion 801, which can mirror those visually displayed to the user on a display. Furthermore, if a graphical user interface is projected onto the touchable surface, then a direct mapping can be present between the visual output and the haptic output.

The user-touchable portion 801 can be controlled to have localized vibrations that can be felt by a user touching the user interface device 800 by controlling the driving elements 1102 to modulate the drive signal to the electrically switchable magnets 802. The frequency of modulation can be changed in order to change the way that the vibration feels to the user, for example between 10 Hz and 500 Hz.

By controlling the magnitude of the driving signal, the size of the raised surface region can be controlled by the processor. This can be utilized to provide additional haptic feedback to the user. This can also be utilized to provide the feeling of a moving raised region to the user by, for example, decreasing the magnitude of the drive signal to one electrically switchable magnet whilst increasing the drive signal to a neighboring electrically switchable magnet, thereby giving the impression to the user that the raised region is smoothly moving across the surface.

When a user pushes down on actuated ferrofluid (i.e. ferrofluid in the presence of a magnetic field) the tactile feeling for the user is similar to that of pushing two repelling magnetic poles together. By increasing or decreasing the strength of the magnetic field from the electrically switchable magnets, the feeling of repulsion can be made stronger or weaker (respectively). Hence the surface can be made to feel softer or harder to the user. This enables the creation of a user interface which has a texture, hardness and/or compliance which varies across its surface.

Figure 13:
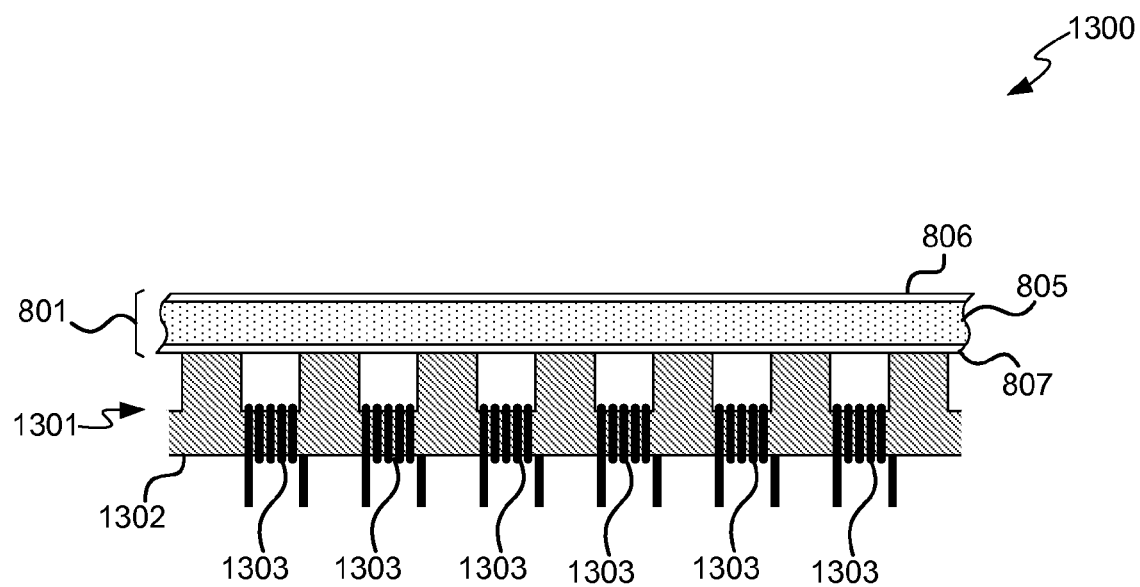
FIG. 13 shows a user interface device for providing haptic feedback using shared-core magnets.

Reference is now made to FIG. 13, which illustrates an alternative user interface device 1300 having a different arrangement of electrically switchable magnets for producing haptic feedback. The user interface device 1300 comprises a user touchable portion 801 having a ferrofluid layer 805 contained between a flexible membrane 806 and a base layer 807, as described with reference to FIG. 8. The user interface device 1300 is connected to a circuit such as illustrated in FIG. 11.

The user interface device 1300 comprises a plurality of electrically switchable magnets 1301 having a shared core 1302. The shared core has a comb-like shape, with coils of wire 1303 wound between the "teeth". When a coil of wire 1303 has a current flowing through it, the two "teeth" either side of the coil of wire 1303 act like a U-shaped horseshoe magnet. Each individual electrically switchable magnet 1301 can therefore be driven and acts much as described above with reference to FIG. 8. In addition, because the core is shared between electrically switchable magnets 1301, the electrically switchable magnets 1301 act more like a single larger magnet when a plurality of the coils of wire 1303 are energized. Furthermore, the electrically switchable magnet 1301 arrangement shown in FIG. 13 can be constructed to be more compact than discrete electromagnets.

The haptic user interface devices as illustrated in FIGS. 8 and 13 are shown with planar user-touchable portions 801. However, such user interface devices can also have non-planar user touchable surfaces incorporating the haptic feedback. For example, the haptic user interface can be integrated with a pointing device such as a mouse, such that the user-touchable portion is wrapped over the surface of the mouse, allowing haptic feedback to be felt by the user whilst using the mouse an input device. Other non-planar applications for the haptic user interface device include for example steering wheels for vehicles, computer game controllers, or the flexible skin of a robot pet which can provide feedback in response to a touch.

Figure 14:
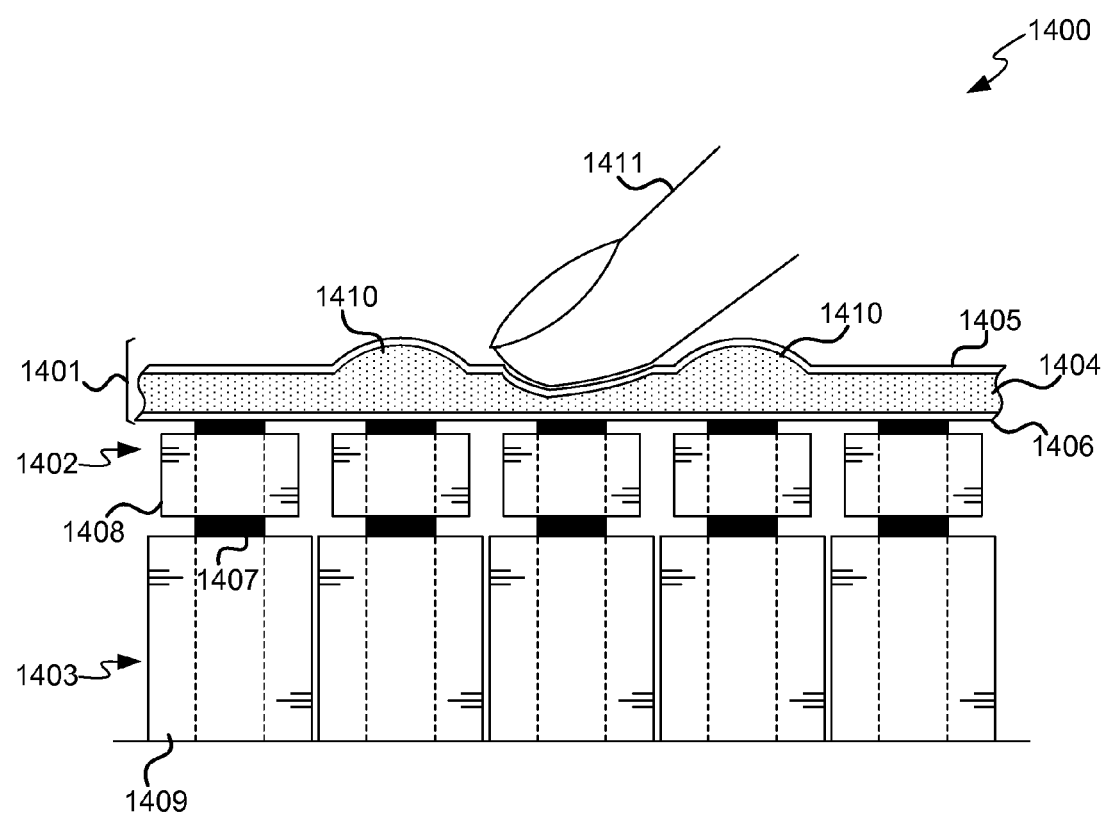
FIG. 14 shows a combined user interface device for detecting touch input and providing haptic feedback.

Reference is now made to FIG. 14, which illustrates a user interface device 1400 that combines the input sensing of the type described above with reference to FIG. 1 with the haptic output of the type described with reference to FIG. 8. The user interface device 1400 comprises a user-touchable portion 1401, below which is a plurality of sensors 1402 and a plurality of electrically switchable magnets 1403.

The user-touchable portion 1401 comprises a ferromagnetic fluid layer 1404 located between a compliant, flexible membrane 1405 forming the surface of the user-touchable portion 1401, and a base layer 1406. The base layer 1406 can be formed from the same compliant material as the flexible membrane 1405, or can be formed from a different, more rigid material.

Preferably, the ferromagnetic fluid layer 1404 comprises a ferrofluid, as described hereinbefore. In an alternative example, the ferromagnetic fluid layer 1404 comprises a magnetorheological fluid. Magnetorheological fluids act differently to ferrofluids in the presence of a magnetic field. Rather than causing a raised surface region (as is the case with ferrofluids), the presence of a magnetic field causes an increase in viscosity in the magnetorheological fluid at the location of the magnetic field. This increase in viscosity can be detected by the touch of a user.

In the example shown in FIG. 14, the user-touchable portion 1401 is mounted directly on top of the sensors 1402. In other examples, a gap can be present between the user-touchable portion 1401 and the sensors 1402, or other hardware can be located between the user-touchable portion 1401 and the sensors 1402, such as a display.

The plurality of sensors 1402 and the plurality of electrically switchable magnets 1403 resemble those described above with reference to FIGS. 1 and 8, respectively. However, the plurality of sensors 1402 and the plurality of electrically switchable magnets 1403 are mounted on shared cores 1407. Each of the sensors 1402 comprises a sensor coil 1408 wound around one of the shared cores 1407, and each of the electrically switchable magnets 1403 comprises a magnet coil 1409 wound around one of the shared cores 1407.

The shared cores 1407 can comprise permanent magnets in order to provide a magnetic field for the sensor coils 1408, such that disturbances in the magnetic field caused by movement in the ferromagnetic fluid layer 1404 are detected by the sensor coils 1408. In an alternative example, the shared cores 1407 do not comprise a permanent magnet, but instead the electrically switchable magnets 1403 can be driven at a low level whenever the device is in operation, in order to provide a magnetic field in which the sensor coils can detect changes.

Figure 15:
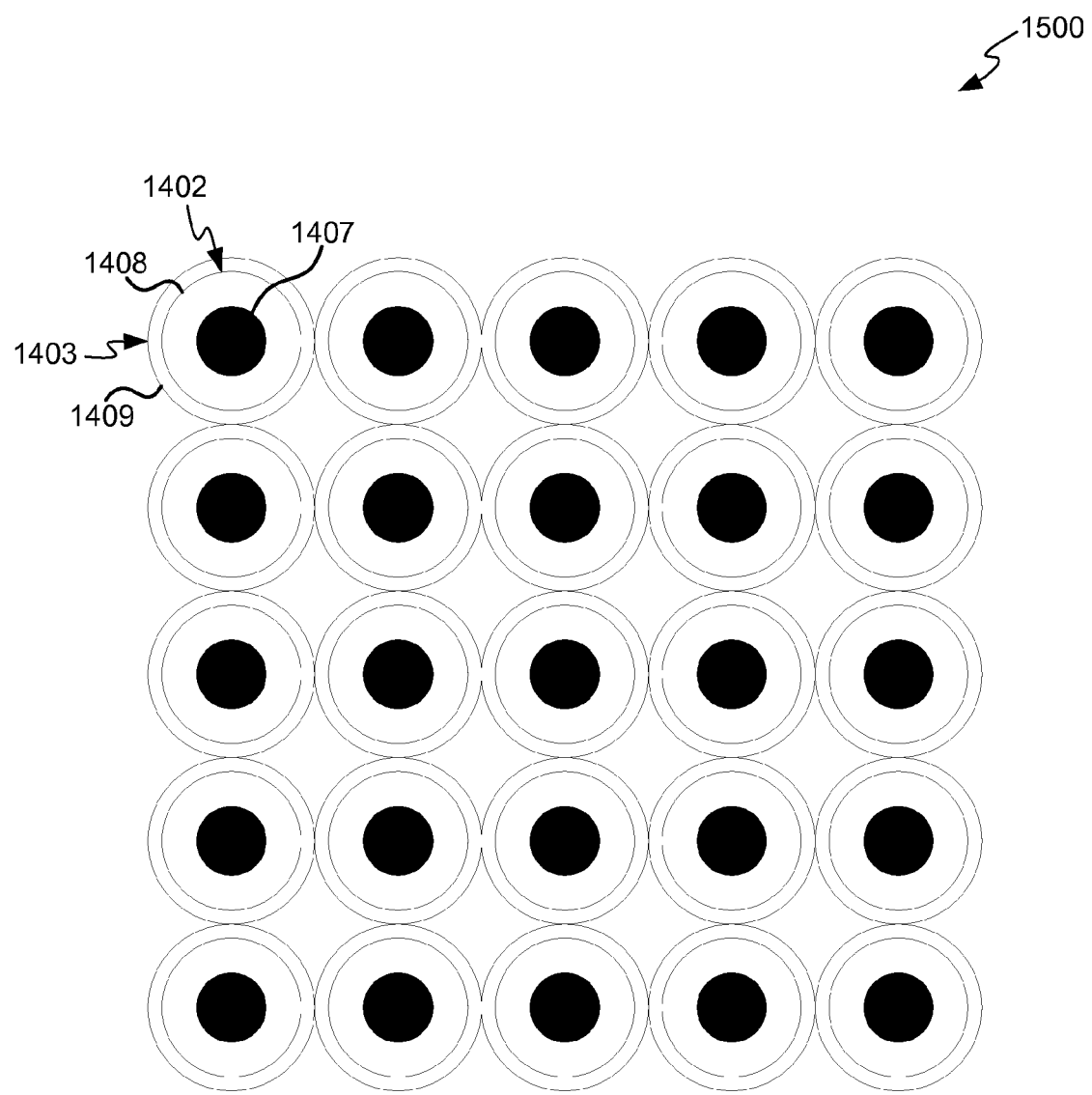
FIG. 15 shows a plan view of a two-dimensional array of sensors and electrically switchable magnet using shared cores.

Because each of the sensors 1402 shares a common core with one of the electrically switchable magnets 1403, the spatial packing density of the sensors 1402 and electrically switchable magnets 1403 is not significantly reduced in a combined user interface device 1400 compared to, for example, FIG. 9 or 10. This is shown illustrated in the plan view of an array 1500 of the sensors 1402 and electrically switchable magnets 1403 in FIG. 15.

Each of the plurality of sensors 1402 is connected to a circuit similar to that shown in FIG. 4. Each of the plurality of electrically switchable magnets 1403 is connected to a circuit similar to that shown in FIG. 11. Note that the processors 401 and 1101 in FIGS. 4 and 11 can be implemented using a single processor in this example.

The operation of the user interface device 1400 for detecting the location of touch inputs from the user is similar to that described above with reference to FIG. 1. In addition, the operation of the user interface device 1400 for producing haptic output is similar to that described above with reference to FIG. 8.

Therefore, a user can touch the user-touchable portion 1401, and the movement in the ferromagnetic fluid layer 1404 induces a current in the sensor coils 1408 in proximity to the movement, which can be analyzed by the processor and the location determined. In addition, the processor can control the magnet coils 1409 in order to produce haptic feedback on the user touchable portion.

The touch input and haptic output aspects can therefore be operated independently in the user interface device 1400. However, because of the proximity of the sensors 1402 to the electrically switchable magnets 1403, changes in the magnetic field around the sensor coils 1408 occur when a sufficiently close magnet coil 1409 is energized or de-energized. The result of this is that a current is induced in one or more of the sensor coils 1408 when one or more of the magnet coils 1409 are activated or deactivated. This is akin to magnetic interference between the electrically switchable magnets 1403 and the sensors 1402. However, because of the fixed nature of the array 1500 of sensors 1402 and the electrically switchable magnets 1403, the amount of current that is induced in the sensors can be predicted by the processor, and cancelled from the electrical signals from each of the sensors 1402.

The processor can perform the cancellation operation by estimating the effect on the electrical signal produced by a given sensor when a current is induced by the activation of given magnet coil. This can be achieved by modeling the behavior of the system in advance in order to ascertain the parameters (such as magnitude and rate of change) of the electrical signal produced by the sensor in question when a given electrically switchable magnet is activated. In addition, periodic self tests of the user interface device 1400 can also be performed by the processor, such that the electrically switchable magnets are activated and deactivated in a specific sequence while the user is not touching the device, and the resultant electrical signals from each sensor is sampled and recorded.

Once the effect on the electrical signals from the sensors 1402 as a result of activating (or deactivating) any given electrically switchable magnet (or combination of electrically switchable magnets) is known, then the processor can cancel this from the electrical signals received. This can be achieved by subtracting the expected magnitude of the interference signal at a given time from the electrical signal received from the sensors 1402.

The accuracy of the cancellation operation can be further improved by taking into account factors that change the magnetic fields produced by the electrically switchable magnets 1403 over time. For example, the temperature of the magnet coils 1409 affects the resistance in the wire, and this therefore affects the magnetic field produced, and hence the amount of current induced in the sensors 1402. The effect of this can be counteracted by monitoring the current flowing to each of the electrically switchable magnets 1403 when it is activated using a current probe circuit, and providing this data to the processor. The processor can use this current data to calibrate the estimated interference on the sensors 1402.

In an alternative example, temperature probes can be placed on the magnet coils 1409 to monitor their temperature, and provide temperature data to the processor. The processor can use this temperature data to calibrate the estimated interference on the sensors 1402. Alternatively, more frequent self-tests of the user interface device 1400 can be performed if it is determined by the processor that the cancellation operation is becoming inaccurate.

The presence of the electrically switched magnets 1403 can also be used to improve the operation of the touch-input detection. If a user touches the user-touchable portion 1401, the ferromagnetic fluid layer is moved, and a current is induced in the relevant sensors 1402. However, if the user then maintains his finger perfectly motionless, then no further current is induced. This can erroneously lead the processor to determine that the user is not touching the user interface device 1400.

To avoid this, the processor can be arranged to send one or more pulses into the ferromagnetic fluid, by energizing one or more of the electrically switchable magnets 1403. The processor can predict the effect that such a pulse has on the electrical signals from the sensors 1402 (e.g. through prior modeling or self-tests similar to those described above). However, in the location where a motionless finger is located the effect on the sensors is different to that predicted, due to the difference in the thickness of the ferromagnetic fluid in the presence of the user's finger. The processor can use this discrepancy to determine that a motionless touch input is present at that particular location. The processor can be arranged to periodically send such pulses through the ferromagnetic fluid, or can be arranged to do so only when the processor has "lost" the location of the user's finger.

The ability to provide haptic feedback on the same user interface device that is used to detect touch-based input enables more accurate and engaging interaction between a user and a computer. In particular, haptic feedback can be applied responsive to certain detected touch-based inputs and/or responsive to a particular application that the user interface device is controlling. For example, the user interface device 1400 can generate virtual buttons, boundaries, controls and shapes with which the user can interact as they provide touch input.

For example, the user can use the user interface device 1400 to move a cursor around a display and select controls and buttons. When the user has placed the cursor over a button, the processor can control the electrically switchable magnets to create a boundary around the location of the user's finger, so that the user can physically feel where he can press to activate the button. The user can then depress the flexible membrane 1405 to activate the virtual button. This is illustrated in FIG. 14, where the processor has created a boundary made of raised bumps 1410 on the surface of the ferromagnetic fluid layer 1404. The user's finger 1411 can feel the boundary, and activate the virtual button by depressing the region surrounded by the boundary.

In another example, the region under the user's finger can be made to vibrate by modulating the drive signals to the electrically switchable magnets 1403. The user can move a cursor around a display using the user interface device 1400, and when the cursor passes over a button or other activatable control, the processor causes the region under the user's finger to vibrate. The user therefore feels a "buzz" whenever he draws the cursor over an activatable control, which increases the feeling of engagement with the computer, and also increases the ease of use as the user clearly knows which regions of the display are activatable.

In another example, haptic feedback can be used to indicate an error condition. For example, if the user attempts to click on a region of the display that does not contain an activatable control, then the region under the user's finger can be made to vibrate with a particular frequency to indicate that this is not a possible action. Alternatively, the region under the user's finger can be raised or hardened, such that the user-touchable portion is no longer compliant, indicating that this region cannot be selected or clicked.

Figure 16:
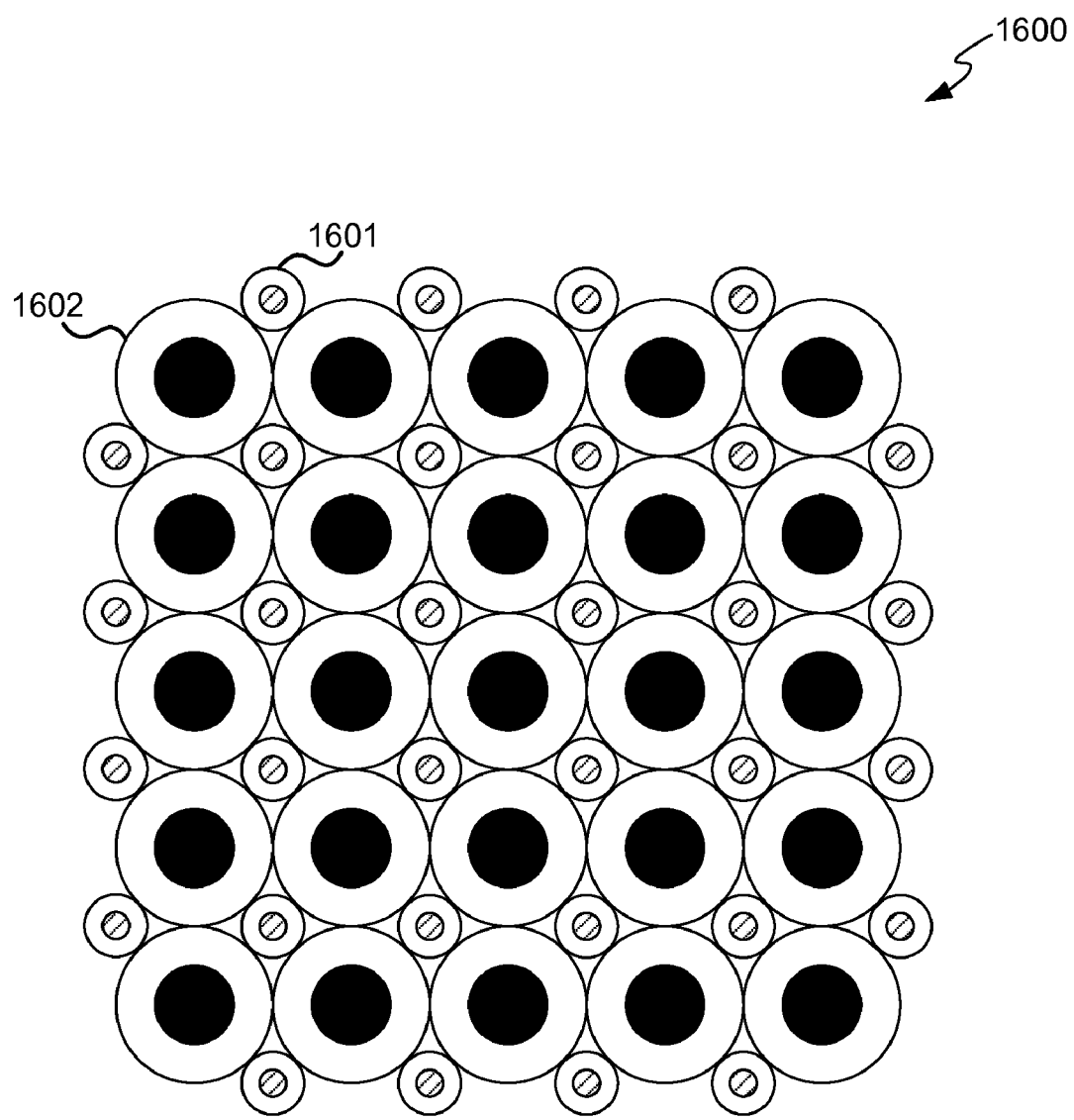
FIG. 16 shows a plan view of a two-dimensional array of interleaved sensors and electrically switchable magnets.

Reference is now made to FIG. 16, which illustrates a plan view of an alternative array 1600 of sensors 1601 and electrically activatable magnets 1602. In this alternative array 1600, the sensors 1601 and electrically activatable magnets 1602 do not share a common core, but instead are separate and interleaved. The sensors 1601 are located in gaps formed by the arrangement of the electrically activatable magnets 1602 in a grid. This is possible because the sensors 1601 can be made small relative to the electrically activatable magnets 1602. This arrangement maintains the spatial packing density of the electrically activatable magnets 1602 compared to FIG. 15.

The example shown in FIG. 16 operates in a similar manner to that described above with reference to FIG. 14. Cancellation of electrical signals induced in the sensors 1601 by the activation or deactivation of one or more of the electrically switchable magnets 1602 can be performed in a similar manner. Analysis of the relative arrival times of signals between sensors can be performed as described above, if a greater spatial input resolution is desired than that provided by the spacing of the sensors 1601.

Note that in other examples, any suitable arrangement of sensors and electrically activatable magnets can be used. Note also that in any of the previously described examples, sensors that utilize coils of wire can be replaced with MEMS magneto sensors, hall-effect sensors, or any other sensor suitable for sensing movement of a ferromagnetic material.

In the examples described hereinbefore, for touch-input user interface devices (such as device 100 in FIG. 1), haptic feedback user interface devices (such as device 800 in FIG. 8), and combined user interface devices (such as device 1400 in FIG. 14) a ferromagnetic fluid can be used as part of the user-touchable portion. As stated, the ferromagnetic fluid is contained between the flexible membrane and the base layer. This can be in the form of ferromagnetic fluid held within a non-pressurized bag. However, in order to control or restrain the movement of the fluid, the ferromagnetic fluid between the flexible membrane and the base layer can be suitably pressurized.

Furthermore, in another example, the ferromagnetic fluid layer can be divided up into a number of cells or "pockets", each holding a quantity of ferromagnetic fluid. This limits the gross movement of the ferromagnetic fluid within the ferromagnetic fluid layer, and can enable the user interface devices to be used in non-horizontal applications without the ferromagnetic fluid sinking under gravity to one side of the user touchable portion.

The movement of the ferromagnetic fluid within the user touchable portion can also be controlled by providing a deformable porous substrate, such as a foam or sponge, within the ferromagnetic fluid layer. The deformable porous substrate is saturated with ferromagnetic fluid, such that it still behaves as described above, but the overall movement of the ferromagnetic fluid is restricted. The porosity of the deformable porous substrate can be selected in accordance with the desired amount of movement of the ferromagnetic fluid.

Figure 17:
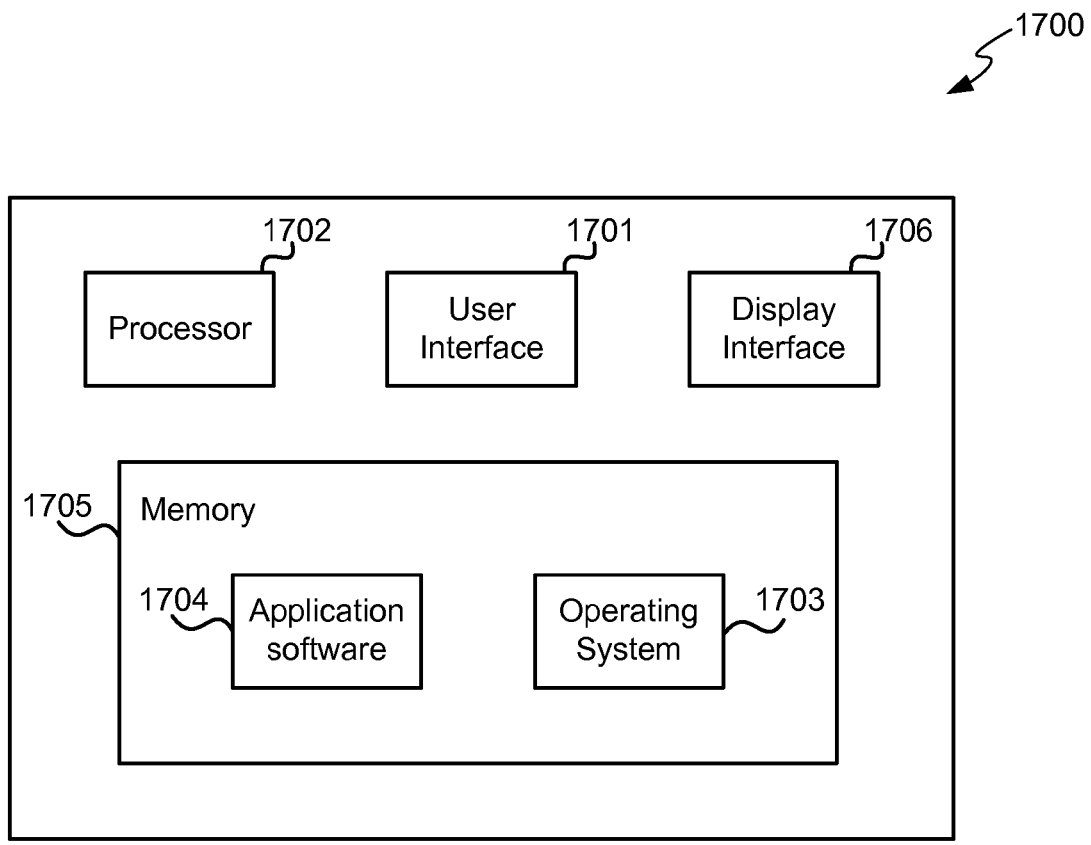
FIG. 17 shows an exemplary computing-based device in which embodiments of a ferromagnetic user interface may be implemented.

FIG. 17 illustrates various components of an exemplary computing-based device 1700 which may be implemented as any form of a computing and/or electronic device, and in which embodiments of a ferromagnetic user interface device may be implemented.

The computing-based device 1700 comprises one or more ferromagnetic user interface devices 1701, such as those described hereinbefore.

Computing-based device 1700 also comprises one or more processors 1702 which may be microprocessors, controllers or any other suitable type of processors for processing computing executable instructions to control the operation of the ferromagnetic user interface device. Platform software comprising an operating system 1703 or any other suitable platform software may be provided at the computing-based device to enable application software 1704 to be executed on the device.

The computer executable instructions may be provided using any computer-readable media, such as memory 1705. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface via a display interface 1706, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A user interface device, comprising
a plurality of sensors;
a plurality of electrically switchable magnets;
a processor;
a first interface circuit connected to the sensors and arranged to provide electrical signals from each of the sensors to the processor;
a second interface circuit connected to the processor and each of the plurality of electrically switchable magnets, and arranged to activate one or more of the electrically switchable magnets responsive to a command from the processor; and
a user-touchable portion comprising a ferromagnetic material layer,
wherein the plurality of sensors is positioned relative to the ferromagnetic material layer such that movement of the ferromagnetic material by a user causes a change in the electrical signals from at least one of the sensors, and the plurality of electrically switchable magnets is positioned relative to the ferromagnetic material layer such that activation of one or more of the electrically switchable magnets causes a change in the ferromagnetic material layer which is detectable by the touch of a user, and
wherein the processor is arranged to analyze the electrical signals from each of the sensors, determine the location of movement on the user-touchable portion, and activate one or more of the electrically switchable magnets responsive thereto, the processor being arranged to estimate and cancel an interfering electrical signal caused in one or more sensors by the activation of one or more of the electrically switchable magnets.

2. A user interface device as claimed in claim 1, wherein each of the sensors comprises a sensor coil and a magnetic core.

3. A user interface device as claimed in claim 1, wherein each of the sensors comprises a micro-electromechanical sensor or a hall-effect sensor.

4. A user interface device as claimed in claim 1, wherein the sensors are arranged in a two-dimensional array.

5. A user interface device as claimed in claim 4, wherein the processor is arranged to determine the location of the movement in a plane substantially parallel to the two-dimensional array and the acceleration of movement substantially perpendicular the two-dimensional array.

6. A user interface device as claimed in claim 1, wherein the movable ferromagnetic material comprises a ferromagnetic fluid layer.

7. A user interface device as claimed in claim 6, wherein the ferromagnetic fluid layer comprises a magnetorheological fluid.

8. A user interface device as claimed in claim 6, wherein the ferromagnetic fluid layer comprises a ferrofluid.

9. A user interface device as claimed in claim 6, wherein the ferromagnetic fluid is held within a deformable porous substrate.

10. A user interface device as claimed in claim 1, wherein the movable ferromagnetic material comprises at least one of: one or more ball bearings; iron filings; and ferromagnetic bristles.

11. A user interface device as claimed in claim 1, wherein the interface circuit comprises a plurality of amplifiers, each connected to one of the plurality of sensors, and at least one analogue to digital converter connected to the plurality of amplifiers.

12. A user interface device as claimed in claim 1, wherein the change in the ferromagnetic material is a raised surface region and the processor is arranged to activate the electrically switchable magnets in a sequence so as to move the raised surface region on the ferrofluid layer.

13. A user interface device as claimed in claim 1, wherein the change in the ferromagnetic material is a raised surface region and the processor is arranged to modulate the activation of the electrically switchable magnets so as to cause the raised surface region on the ferrofluid layer to vibrate.

14. A user interface device as claimed in claim 1, wherein the electrically switchable magnets are arranged in a two-dimensional array.

15. A user interface device as claimed in claim 1, wherein the electrically switchable magnets are electromagnets.

16. A user interface device as claimed in claim 1, wherein each sensor in the plurality of sensors is mounted on a shared core with a respective electrically switchable magnet from the plurality of electrically switchable magnets.

17. A user interface device as claimed in claim 1, wherein the sensors and the electrically switchable magnets are interleaved in a two-dimensional array.

18. A user interface device as claimed in claim 1, wherein the processor is arranged to estimate the interfering electrical using results of a self test.

19. A method comprising:
receiving, at a processor, electrical signals from one or more of a plurality of sensors, the plurality of sensors being positioned relative to a ferromagnetic material layer of a user-touchable portion such that movement of the ferromagnetic material causes a change in the electrical signals from at least one of the sensors;
analyzing the electrical signals;
determining a location of movement on the user-touchable portion; and
activating one or more of a plurality of electrically switchable magnets, the plurality of electrically switchable magnets being positioned relative to the ferromagnetic material layer such that activation of one or more of the electrically switchable magnets causes a change in the ferromagnetic material layer which is detectable by touch,
determining the location including:
estimating an interfering electrical signal caused in one or more sensors by activating the one or more of the electrically switchable magnets, and
canceling the interfering electrical signal.

20. A computer storage medium, the computer storage medium not being a signal per se, storing computer-readable instructions which, when executed, perform a process comprising:
receiving electrical signals from one or more of a plurality of sensors, the plurality of sensors being positioned relative to a ferromagnetic material layer of a user-touchable portion such that movement of the ferromagnetic material causes a change in the electrical signals from at least one of the sensors;
analyzing the electrical signals;
determining a location of movement on the user-touchable portion; and
activating one or more of a plurality of electrically switchable magnets, the plurality of electrically switchable magnets being positioned relative to the ferromagnetic material layer such that activation of one or more of the electrically switchable magnets causes a change in the ferromagnetic material layer which is detectable by touch,
determining the location including:
estimating an interfering electrical signal caused in one or more sensors by activating the one or more of the electrically switchable magnets, and
canceling the interfering electrical signal.

\* \* \* \* \*